US010092937B2

(12) United States Patent
Dani (10) Patent No.: US 10,092,937 B2
(45) Date of Patent: Oct. 9, 2018

(54) MEASURING UNIT FOR MEASURING THE BENDING RADIUS AND THE FORWARDING OF A WORKPIECE IN A BENDING MACHINE

(71) Applicant: CTE SISTEMI S.r.l., Genoa (IT)

(72) Inventor: Marco Dani, Genoa (IT)

(73) Assignee: CTE SISTEMI S.R.L., Genoa (IT)

( * ) Notice: Subject to any disclaimer, the term of this patent is extended or adjusted under 35 U.S.C. 154(b) by 965 days.

(21) Appl. No.: 14/547,902

(22) Filed: Nov. 19, 2014

(65) Prior Publication Data

US 2015/0135787 A1 May 21, 2015

(30) Foreign Application Priority Data

Nov. 19, 2013 (IT) .............................. TO2013A0936

(51) Int. Cl.
*G01N 3/32* (2006.01)
*B21D 7/14* (2006.01)
*G01B 5/04* (2006.01)
*G01B 5/213* (2006.01)
*B21D 7/08* (2006.01)

(52) U.S. Cl.
CPC ................ *B21D 7/14* (2013.01); *G01B 5/043* (2013.01); *G01B 5/213* (2013.01); *B21D 7/08* (2013.01); *G01B 2210/44* (2013.01)

(58) Field of Classification Search
CPC .......... B21D 7/14; G01B 5/043; G01B 5/213; G01N 3/32
USPC ........................................................... 73/812
See application file for complete search history.

(56) References Cited

U.S. PATENT DOCUMENTS

| 4,054,982 | A |   | 10/1977 | Damman |             |
|-----------|---|---|---------|--------|-------------|
| 4,164,133 | A | * | 8/1979  | Damman | B21D 53/30  |
|           |   |   |         |        | 72/12.5     |
| 4,730,498 | A | * | 3/1988  | Blanch | G01N 3/20   |
|           |   |   |         |        | 73/852      |
| 4,761,979 | A | * | 8/1988  | Kawaguchi | B21D 5/14 |
|           |   |   |         |        | 72/16.2     |
| 5,430,665 | A |   | 7/1995  | Zhi et al. |         |
| 5,992,210 | A | * | 11/1999 | Blurton-Jones | B21D 7/14 |
|           |   |   |         |        | 72/149      |

(Continued)

FOREIGN PATENT DOCUMENTS

CH         617876 A5    6/1980
DE         2360780 B1   2/1975

(Continued)

OTHER PUBLICATIONS

European Search Report and Opinion for related European Application No. EP16159089, dated May 30, 2016.

(Continued)

*Primary Examiner* — Jonathan Dunlap
*Assistant Examiner* — Octavia Hollington
(74) *Attorney, Agent, or Firm* — Meunier Carlin & Curfman LLC (57) ABSTRACT

The measuring unit comprises a first carriage arranged to be connected to the bending machine and to be passed through by the workpiece under bending coming from the bending machine. The first carriage comprises: a main body; a pair of measure rollers; a first measuring device; a guide device; an elastic device; a second measuring device; and a positioning device.

9 Claims, 9 Drawing Sheets (56) References Cited

U.S. PATENT DOCUMENTS

| | | | | |
|---|---|---|---|---|
| 7,325,427 | B2* | 2/2008 | Ingvarsson | B21D 5/14 |
| | | | | 72/173 |
| 9,227,236 | B2* | 1/2016 | Hermes | B21D 7/08 |
| 9,643,371 | B2* | 5/2017 | Reinlein | B29D 23/00 |
| 9,842,690 | B2* | 12/2017 | Dani | B21D 1/00 |
| 2010/0281937 | A1* | 11/2010 | Caporusso | B21D 7/08 |
| | | | | 72/8.3 |

FOREIGN PATENT DOCUMENTS

| | | |
|---|---|---|
| EP | 0767016 A2 | 4/1997 |
| EP | 2166307 A1 | 3/2010 |

OTHER PUBLICATIONS

European Search Report for related European Application No. EP14193735, dated Jul. 10, 2015.
Italian Search Report for related Italian Application No. TO2013A000936, dated Jul. 9, 2014.

* cited by examiner

MEASURING UNIT FOR MEASURING THE BENDING RADIUS AND THE FORWARDING OF A WORKPIECE IN A BENDING MACHINE

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The present invention relates to a measuring unit intended to be used in a bending machine, in particular in a bending machine for bending conductors for superconductive coils, to measure the bending radius and the forwarding, in particular the forwarding after bending, of the workpiece under bending, as specified in the preamble of independent claim 1. Such a measuring unit is known from EP 0 767 016 A2.

It is known that a workpiece under bending in a bending machine undergoes changes in length (which are typically in the sense of an increase in the length of the workpiece, but which may also be in the sense of a reduction in the length of the workpiece) as a result of the plastic deformations to which the workpiece is subject during the bending process. It follows that in all those applications where it is required to measure in real time, as much precisely as possible, the forwarding of the workpiece, in order to be able to control the bending process taking into account the actual measure, it is not sufficient to provide for measuring device arranged to measure the forwarding of the workpiece upstream of the bending machine, but it is necessary to provide for measuring devices that are also placed downstream of the bending machine, whereby the actual forwarding of the workpiece after bending can be measured. An application where the control of the forwarding of the workpiece is of the utmost importance is for example the manufacturing of superconductive coils, such as those intended to be used in nuclear fusion reactors. These coils are in fact manufactured by bending very long conductors, for example with a length in the order of hundreds of meters, and therefore an inadequately precise control of the forwarding may result in exceeding the prescribed dimensional and geometric tolerances and hence in having to discard the thus manufactured coils, with—as is evident—very significant economic damages.

In addition to the forwarding, another fundamental parameter of the bending process is the bending radius. It is therefore advantageous to provide a measuring unit that allows to measure both the forwarding, in particular the forwarding after bending, and the bending radius of the workpiece that is being bent in a bending machine.

According to the solution disclosed in the above-mentioned prior art document EP 0 767 016 A2, the measuring unit comprises: a support structure; a pair of measure rollers mounted on respective movable bodies so as to rotate idly about respective axes of rotation parallel to each other and perpendicular to the bending plane; a pair of encoders associated each to a respective measure roller to measure the angular position of each measure roller about the respective axis of rotation; a pair of linear guides for guiding the movable bodies along a straight direction perpendicular to the axes of rotation of the measure rollers; a pair of springs interposed each between the support structure and a respective movable body to urge the measure roller carried by this body against the extrados surface and against the intrados surface of the workpiece, respectively; a linear sensor adapted to measure the distance between the extrados and intrados surfaces of the workpiece; and a pair of guide rollers that are mounted at the ends of respective arms of the support structure oriented parallel to the linear guides and arranged on opposite sides of the linear guides and that are kept continuously in contact with the intrados surface of the workpiece to ensure the correct positioning of the support structure, and hence of the linear guides, relative to the workpiece. The fact that the guide rollers are kept in contact with the intrados surface of the workpiece is ensured by the elastic force applied by the spring that acts on the movable body carrying the measure roller in contact with the extrados surface of the workpiece being greater than the elastic force applied by the other spring. In other words, the measure roller in contact with the extrados surface of the workpiece acts also as counter roller that, acting on the workpiece on the opposite sides with respect to the two guide rollers, ensures the correct positioning of the support structure relative to the workpiece.

The main drawback of this known solution is that the normal force applied by the measure roller in contact with the extrados surface of the workpiece causes the latter to flex, at least elastically, which results in a change in the curvature of the workpiece (the lower the flexural modulus of the workpiece, the higher the curvature change) just at that section where measuring is carried out by the measure rollers. This results in a reduction in the measurement precision.

BRIEF SUMMARY OF THE INVENTION

It is an object of the present invention to provide a measuring unit for measuring the bending radius and the forwarding, in particular the forwarding after bending, of a workpiece under bending in a bending machine, which offers a higher measurement precision than the above-discussed prior art.

This and other objects are fully achieved according to the present invention by virtue of a measuring unit having the features set forth in the enclosed independent claim 1.

Further advantageous features of the invention are set forth in the dependent claims, the content of which is to be regarded as an integral and integrating part of the following description.

In short, the invention is based on the idea of providing a measuring unit of the type comprising a first carriage having a main body, a pair of support bodies carried by the main body, a pair of measure rollers mounted each on a respective support body so as to be idly rotatable about respective axes of rotation parallel to each other, guide means carried by the first carriage to guide the support bodies along a straight direction perpendicular to, and passing through, the axes of rotation of the measure rollers, elastic means arranged to apply on the support bodies an elastic force tending to urge the latter towards each other, and therefore to urge each measure roller against the intrados surface and the extrados surface, respectively, of the workpiece that is being forwarded between the measure rollers, first measuring means arranged to provide a signal indicative of the angular position of each of the measure rollers about the respective axis of rotation, second measuring means arranged to provide a signal indicative of the distance between the axes of rotation of the measure rollers, and positioning means arranged to define a positioning of the main body relative to the workpiece under bending, wherein said elastic means comprise one or more springs which are connected each at one end thereof to one of the two support bodies and at the opposite end to the other support body, and wherein said positioning means comprise a first pair of guide rollers and a second pair of guide rollers which are arranged upstream and downstream of the measure rollers, respectively, and are supported by the main body so as to be idly rotatable about respective axes of rotation parallel to the axes of rotation of the measure rollers. By virtue of such an arrangement of the spring(s), in the measuring unit according to the invention the contact forces of the measure rollers with the workpiece are always equal to each other. In other words, there is no resulting normal force that may cause deformations in the workpiece and therefore those measurement errors that in the above-discussed prior art are due to the deformations produced in the workpiece by the resulting normal force acting on the same are avoided.

According to a further aspect of the present invention, the first carriage further comprises marking means arranged to produce an optically-detectable mark on the workpiece and the measuring unit further comprises a second carriage provided with optical detection means arranged to detect the mark produced by the marking means on the workpiece, the first and second carriages being kept by retaining means at a given fixed distance, measured along the workpiece, i.e. along a direction (straight or curved direction) parallel to the longitudinal axis of the workpiece itself.

Since retaining means are provided for, which allow to ensure that a fixed distance, known with high precision, is kept along the workpiece between the marking means and the optical detection means, it is possible for example to reset the measure of the forwarding after bending given by the first measuring means whenever the mark produced by the marking means is detected by the optical detection means, as the actual forwarding of the workpiece after bending is equal to the fixed distance between the marking means and the optical detection means. In this manner, the measurement errors (though very little) which are committed by the first measuring means at each rotation of the measure rollers, and which therefore add up to one another rotation after rotation, are therefore substantially zeroed at intervals of the forwarding of the workpiece after bending that are equal to the aforesaid fixed distance. This prevents the errors committed by the first measuring means at each rotation from adding up to each other over significant lengths, such as those of the conductors used in the manufacturing of superconductive coils, and resulting in unacceptable final errors in the measure of the forwarding after bending.

This further aspect of the invention, that is to say, the provision of marking means and of optical detection means constrained by the retaining means to be at a given fixed distance from each other, might also be applied to a measuring unit for measuring the forwarding of a workpiece after bending of a different type from the one of the present invention, for example to a measuring unit having a single measure roller that is kept in contact with the extrados surface of the workpiece and measuring means for detecting the angular position of said measure roller about its axis of rotation.

BRIEF DESCRIPTION OF THE SEVERAL VIEWS OF THE DRAWINGS

Further features and advantages of the invention will become more apparent from the following detailed description, given purely by way of non-limiting example with reference to the appended drawings, where.

DETAILED DESCRIPTION OF THE INVENTION

Figure 1:
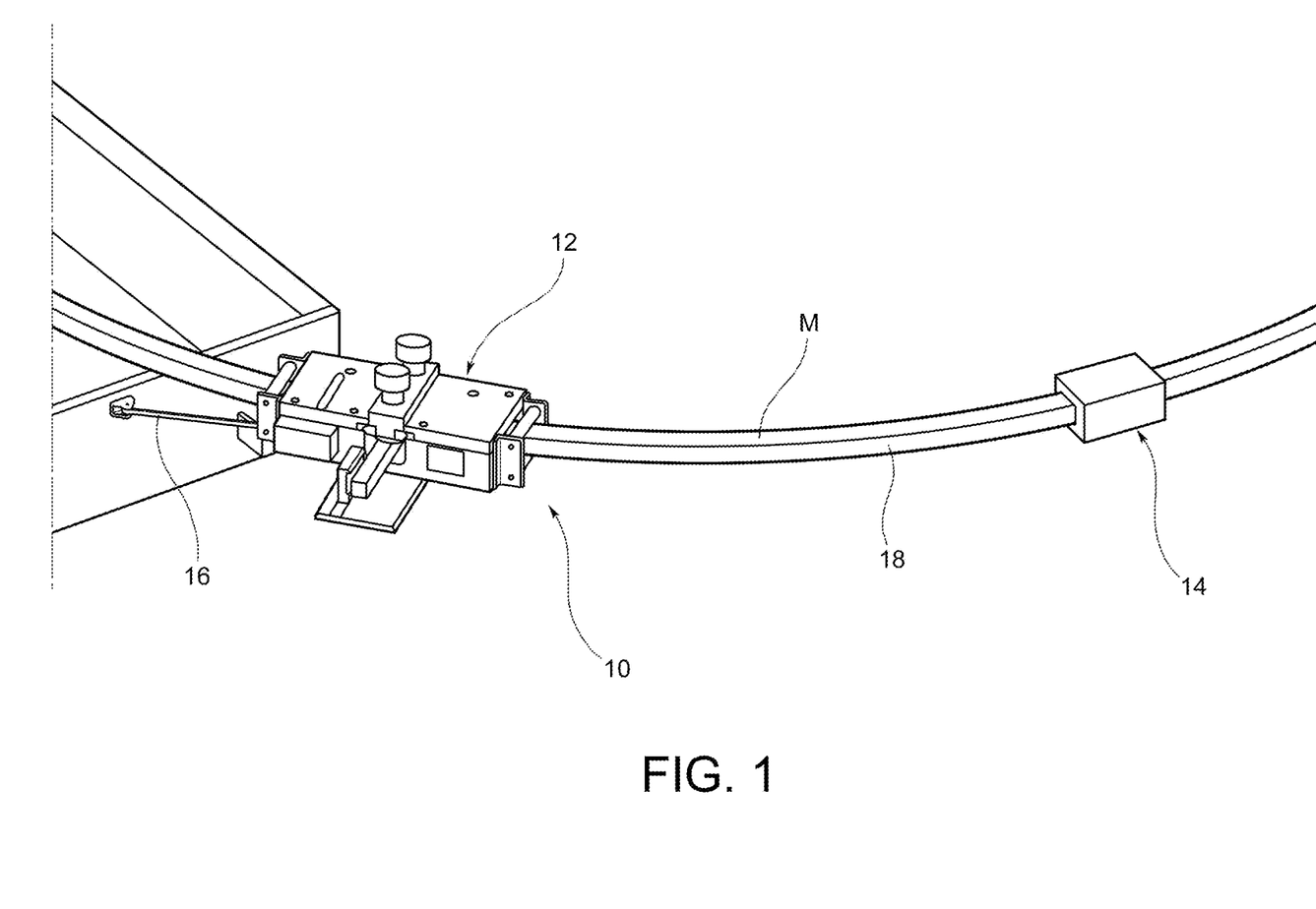
FIG. 1 is a perspective view showing in general a measuring unit according to an embodiment of the present invention.
Figure 2:
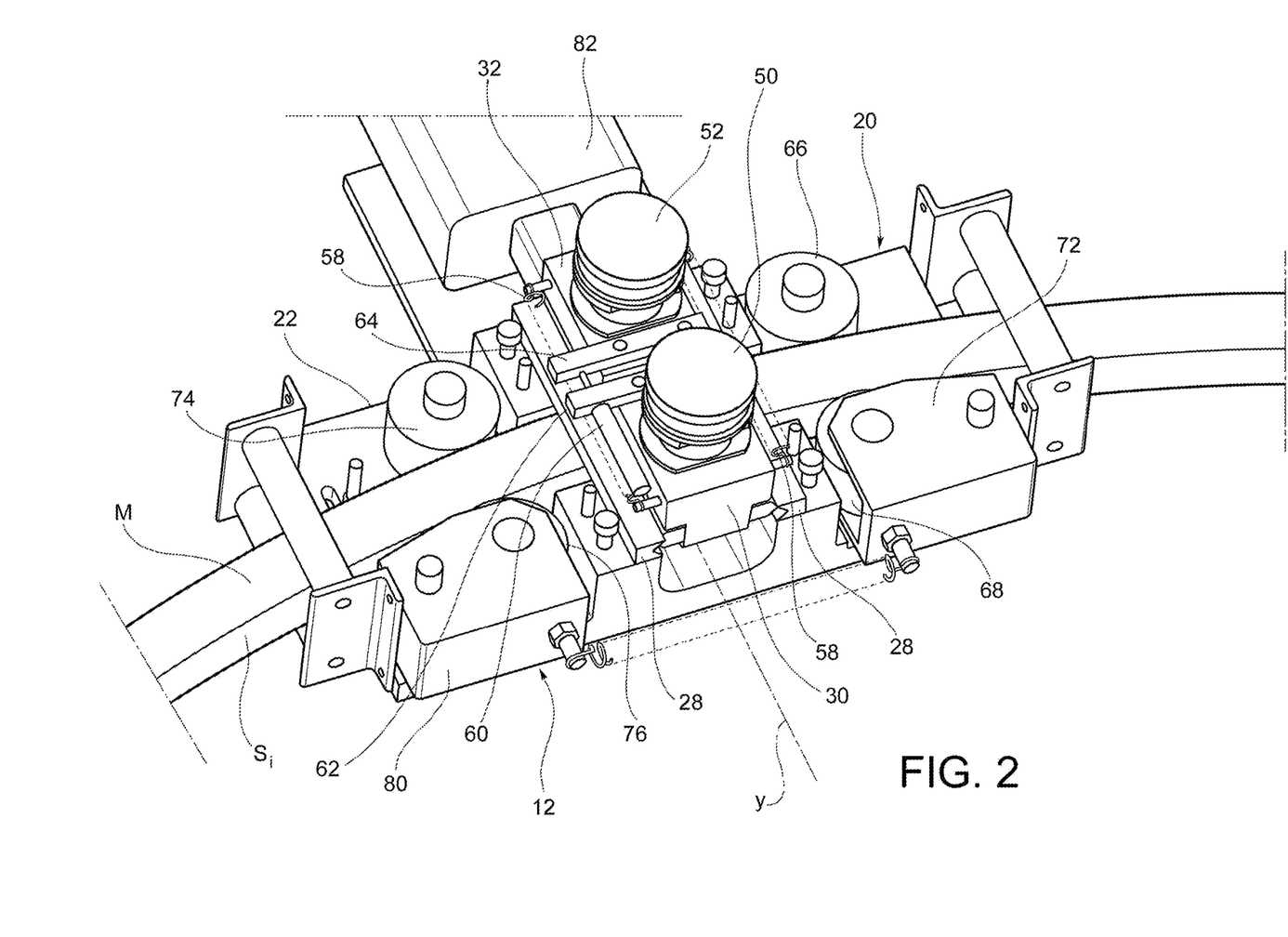
FIG. 2 is a perspective view of the first carriage of the measuring unit of FIG. 1, from which the cover has been removed for the sake of an easier understanding.

With reference first to FIG. 1, a measuring unit for measuring the bending radius and the forwarding, in particular the forwarding after bending, of a workpiece M, such as for example a conductor for superconductive coils, that is being subject to bending in a bending machine (only partially shown in FIG. 1) is generally indicated 10. The measuring unit 10 basically comprises a first carriage 12 (shown in detail in FIGS. 2 to 6) and a second carriage 14 (shown in detail in FIGS. 8 and 9) arranged in this order in the forwarding direction of the workpiece M under bending. The first carriage 12 is connected, for example by a connecting rod 16 (or, in a variant of embodiment, not shown, by a pair of transverse guides) to the bending machine, while the second carriage 14 is connected to the first carriage 12 by retaining means arranged to keep these carriages at a given fixed distance from each other, measured along a direction (straight or curved direction) parallel to the longitudinal axis (indicated x) of the workpiece M. As will be explained in detail later on, the retaining means are preferably formed by a steel ribbon 18, which is secured at a first end thereof to the first carriage 12 and at its opposite end to the second carriage 14 so as to remain in contact with an extrados surface $S_e$ of the workpiece M. The workpiece M coming from the bending machine passes therefore in the order through the first carriage 12 and through the second carriage 14.

Figure 6:
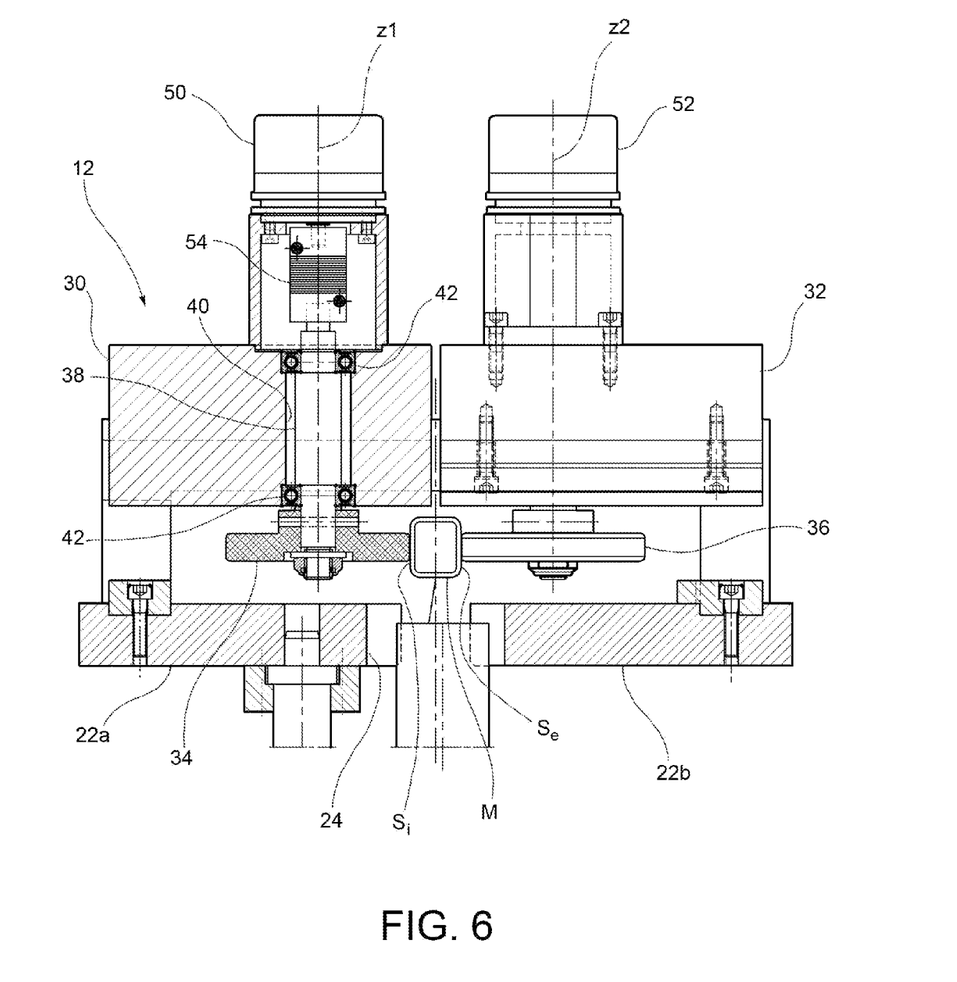
FIG. 6 is a side elevation view of the first carriage of the measuring unit of FIG. 1, partially sectioned through a transverse section plane.

With reference now in particular to FIGS. 2 to 6, the first carriage 12 comprises first of all a main body 20 which is connected to the end of the connected rod 16 opposite to the one connected to the bending machine. The main body 20 comprises a bottom plate 22 (which may be split into two half-plates 22a, 22b spaced from each other by an opening 24, as shown in FIG. 6) and a top plate 26 (also preferably split into two half-plates spaced from each other). The bottom plate 22 and the top plate 26 are arranged parallel to each other and in the working condition of the measuring unit extend parallel to the plane (hereinafter referred to as bending plane) containing the axis x of the workpiece M. In the embodiment shown in the drawings the bending plane is a horizontal plane, but might also have a different orientation. The distance between the two plates 22 and 26 is such as to allow the workpiece M to pass through the space delimited by these plates.

The main body 20 (in particular, though not necessarily, the top plate 26 of the same) carries a pair of guides 28 extending parallel to a straight direction y. A pair of support bodies 30 and 32 are mounted on the guides 28 so as to be slidable in the direction y. On the support bodies 30 and 32 are rotatably mounted respective measure rollers 34 and 36, whose axes of rotation, indicated z1 and z2, respectively, extend parallel to each other in a plane parallel to the direction y and perpendicular to the bending plane. More specifically, the measure roller 34 (hereinafter referred to as first measure roller) is supported by the support body 30 (hereinafter referred to as first support body) so as to be idly rotatable about the axis of rotation z1 (hereinafter referred to as first axis of rotation), while the measure roller 36 (hereinafter referred to as second measure roller) is supported by the support body 32 (hereinafter referred to as second support body) so as to be idly rotatable about the axis of rotation z2 (hereinafter referred to as second axis of rotation). In the embodiment shown in the drawings, where the bending plane is a horizontal plane, the first and second axes of rotation z1 and z2 are vertical axes.

Figure 3:
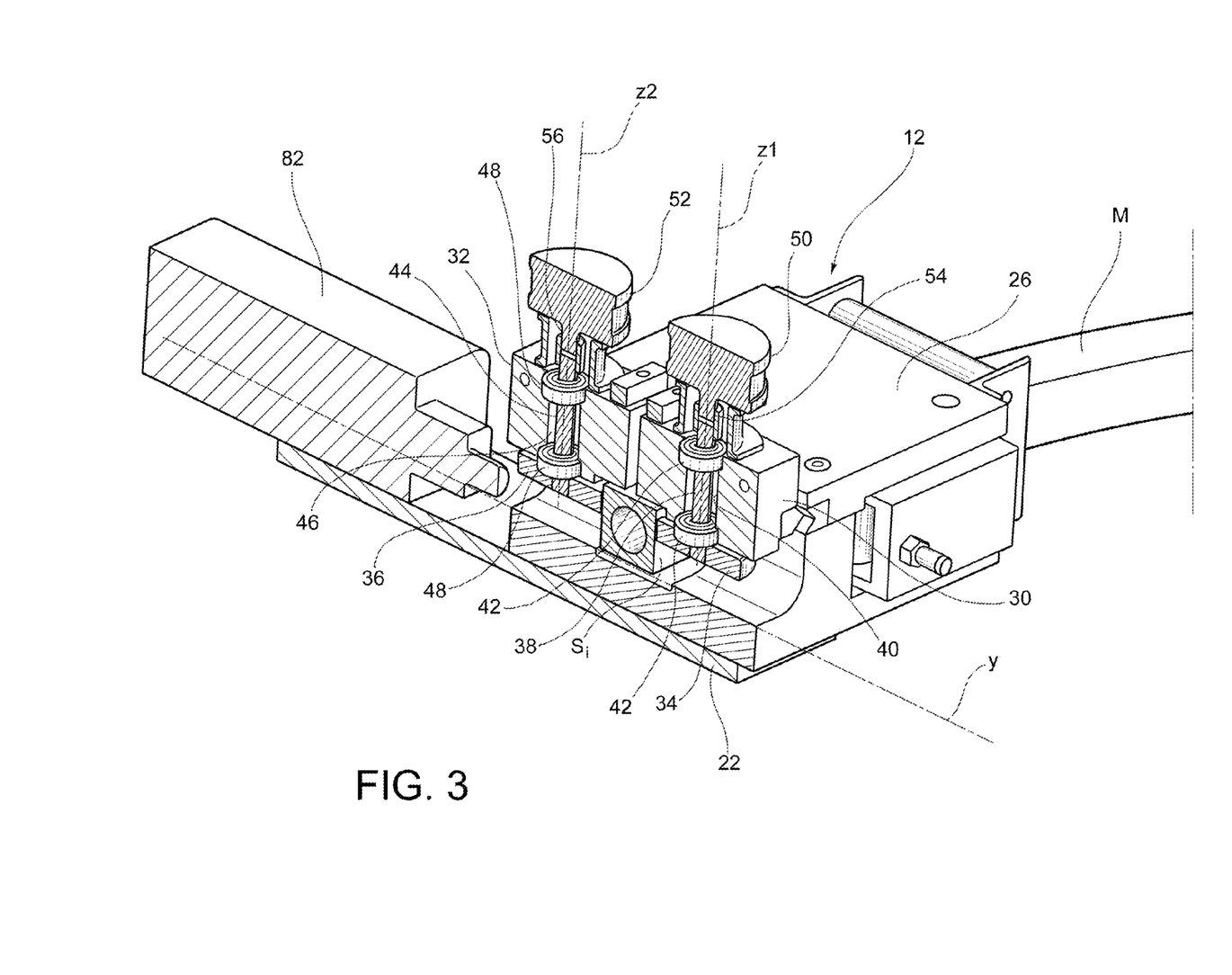
FIG. 3 is a perspective view showing the first carriage of the measuring unit of FIG. 1, sectioned through a transverse section plane (plane passing through the straight direction of the guide means of the first carriage and perpendicular to the plane containing the longitudinal axis of the workpiece under bending)
Figure 4:
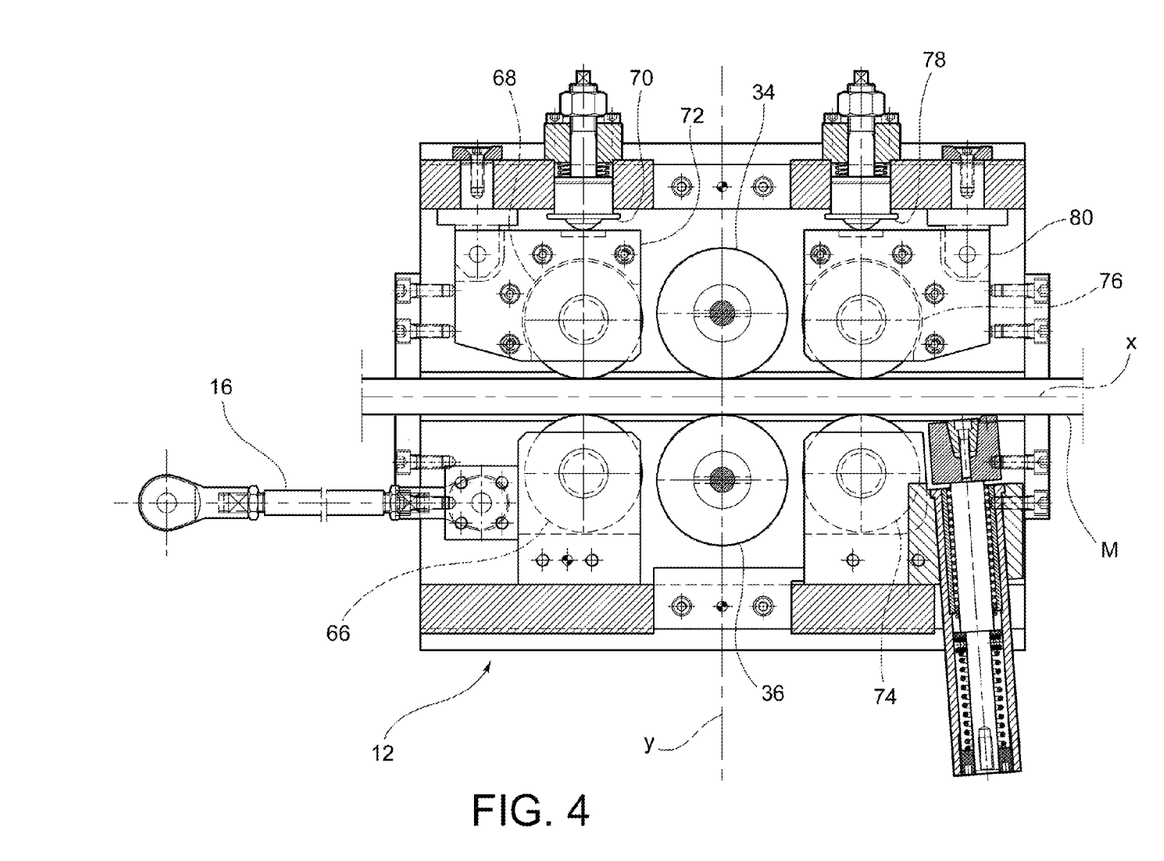
FIG. 4 is a plan view, partially sectioned, of the first carriage of the measuring unit of FIG. 1, in a condition in which the workpiece is not bent.
Figure 5:
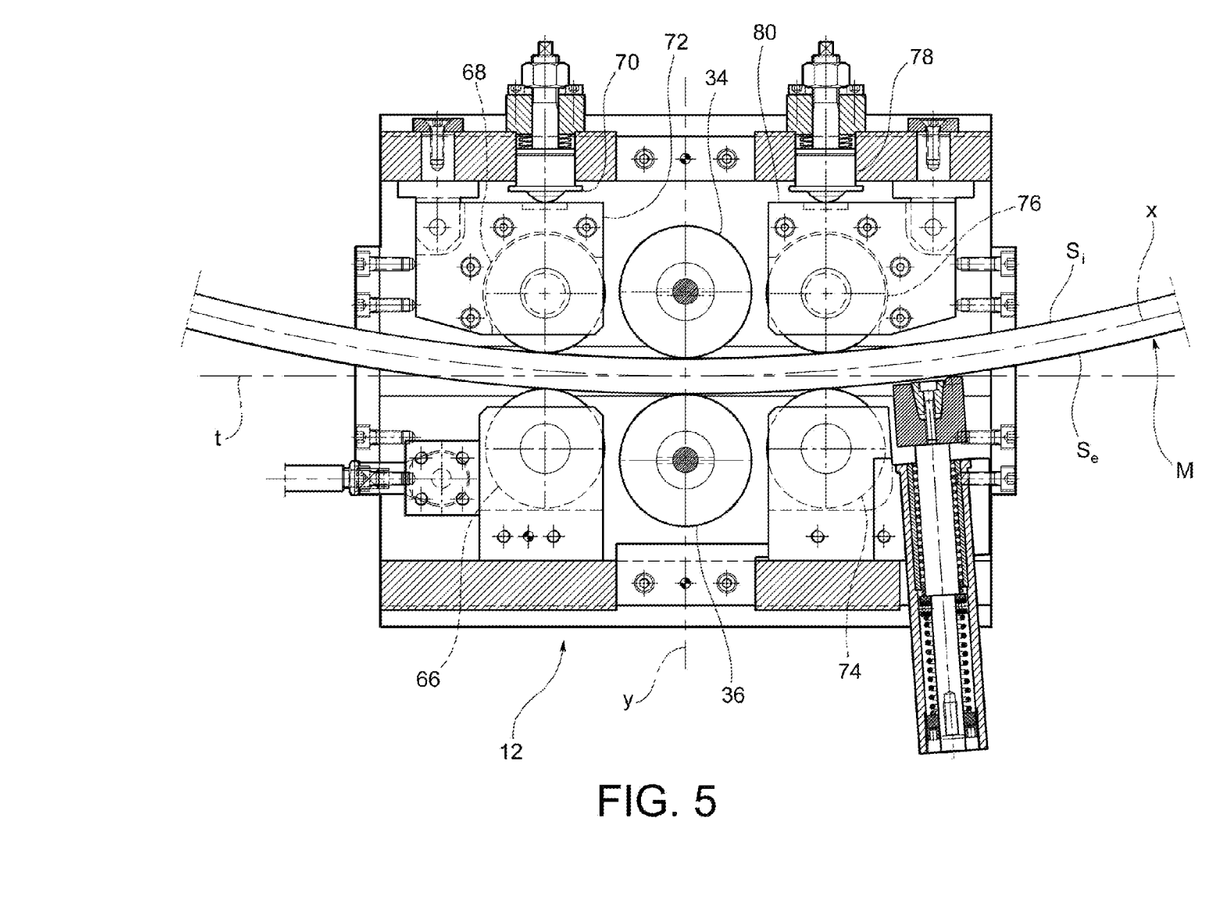
FIG. 5 is a plan view, partially sectioned, of the first carriage of the measuring unit of FIG. 1, in a condition in which the workpiece is bent.

As can be seen in particular in FIGS. 3 and 6, in the embodiment proposed herein the first measure roller 34 is mounted on a first shaft 38 so as to be drivingly connected for rotation therewith. The first shaft 38 is received in a through cavity 40 of the first support body 30 and is supported for rotation about the first axis of rotation z1 by means of a first pair of bearings 42. The second measure roller 36 is mounted on a second shaft 44 so as to be drivingly connected for rotation therewith. The second shaft 44 is received in a through cavity 46 of the second support body 32 and is supported for rotation about the second axis of rotation z2 by means of a second pair of bearings 48. Both the first measure roller 34 and the second measure roller 36 are mounted on bottom end portions of the respective shafts 38 and 44 projecting downwards from the respective support bodies 30 and 32. The measure rollers 34 and 36 are therefore located in the space comprised between the bottom plate 22 and the top plate 26 of the main body 20.

The first carriage 12 further comprises first measuring means arranged to provide a signal indicative of the angular position of each of the two measure rollers 34, 36 about the respective axis of rotation z1, z2. These first measuring means are preferably formed by a pair of encoders 50, 52, each of which is directly or indirectly coupled to a respective measure roller 34, 36. More specifically, in the embodiment proposed herein (as can be seen in particular in FIGS. 3 and 6) the encoder 50 (hereinafter referred to as first encoder) is mounted on the first support body 30 and is connected, for example through a first coupling 54, to the top end of the first shaft 38 so as to be able to measure the angular position of the first measure roller 34 about the first axis of rotation z1. The encoder 52 (hereinafter referred to as second encoder) is mounted on the second support body 32 and is connected, for example through a second coupling 56, to the top end of the second shaft 44 so as to be able to measure the angular position of the second measure roller 36 about the second axis of rotation z2.

The two shafts 38 and 44, along with the two measure rollers 34 and 36 and the two encoders 50 and 52, are therefore drivingly connected for translation with the respective support bodies 30 and 32 in the sliding movement in the direction y along the guides 28.

The first carriage 12 further comprises elastic means arranged to apply on the two support bodies 30 and 32 an elastic force tending to urge these bodies towards each other. By virtue of these elastic means, the two measure rollers 34 and 36 are urged against the respective intrados surface $S_i$ and extrados surface $S_e$ of the workpiece M under bending, when this latter is forwarded between the measure rollers, and therefore roll each on the respective surface of the workpiece. As shown in particular in FIG. 2, according to an embodiment of the present invention said elastic means comprise a pair of springs 58, made for example as cylindrical helical springs, each of which is connected at its opposite ends to the two support bodies 30 and 32 and, for example, extends parallel to the direction y. By virtue of the springs 58 being connected at their opposite ends to the two support bodies 30 and 32, each of them applies an elastic force on the first support body 30 which is equal and opposed to the elastic force applied on the second support body 32. Accordingly, the springs 58 do not produce any resulting normal force on the workpiece M under bending.

The first carriage 12 further comprises second measuring means arranged to provide a signal indicative of the distance between the axes of rotation z1 and z2 of the two measure rollers 34 and 36, and therefore of the transverse size of the workpiece M at the contact points with the two measure rollers 34 and 36. These second measuring means are for example formed by an inductive displacement transducer 60 (FIG. 2) which is configured so as to measure the distance between a pair of reference elements 62 and 64, of which the one is fixed on the first support body 30 at a given distance from the first axis of rotation z1 and the other is fixed on the second support body 32 at a data distance from the second axis of rotation z2.

The first carriage 12 further comprises first positioning means arranged to define the positioning of the main body 20, and hence of the direction y of the guide 28, relative to the workpiece M under bending, whereby during bending with a constant bending radius the tangent (indicated t in FIG. 5) to the longitudinal axis x of the workpiece in the point of intersection between this axis and the direction y is perpendicular to this direction. In the embodiment proposed herein, as can be seen in particular in FIGS. 2, 4 and 5, these positioning means comprise a first pair of guide rollers 66 and 68 which are located upstream (or downstream) of the two measure rollers 34 and 36 and are supported by the main body 20 so as to be idly rotatable about respective axes of rotation parallel to the axes of rotation z1 and z2 of the measure rollers. The guide roller 66 is mounted with its axis of rotation fixed relative to the main body 20, while the guide roller 68 is elastically urged towards the guide roller 66 by means of a spring-loaded urging member 70. The urging member 70 acts, in the direction joining the axes of rotation of the guide rollers 66 and 68, on a support body 72 which rotatably supports the guide roller 68 and is hinged to the main body 20 about an axis spaced from the aforesaid direction. Preferably, the positioning means further comprise a second pair of guide rollers 74 and 76 which are placed downstream (or upstream) of the two measure rollers 34 and 36 and are supported by the main body 20 so as to be idly rotatable about respective axes of rotation parallel to the axes of rotation z1 and z2 of the measure rollers. The guide roller 74 is mounted with its axis of rotation fixed relative to the main body 20, while the guide roller 76 is elastically urged towards the guide roller 74 by means of a spring-loaded urging member 78. The urging member 78 acts, in the direction joining the axes of rotation of the guide rollers 74 and 76, on a support body 80 which rotatably supports the guide roller 76 and is hinged to the main body 20 about an axis spaced from the aforesaid direction. Preferably, the axes of rotation of the rollers 66 and 68 of the first pair of guide rollers are positioned at the same distance as the axes of rotation of the rollers 74 and 76 of the second pair of guide rollers from a transverse plane passing through the direction y and extending perpendicular to the tangent t.

The workpiece M under bending that is forwarded through the first carriage 12 moves therefore in the order between the first pair of guide rollers 66 and 68, between the two measure rollers 34 and 36 and between the second pair of guide rollers 74 and 76. Due to the action of the elastic means (urging member 70 for the first pair of guide rollers 66 and 68, springs 58 for the two measure rollers 34 and 36 and urging member 78 for the second pair of guide rollers 74 and 76) associated to the rollers, the latter are kept in contact with the intrados surface $S_i$ and the extrados surface $S_e$ of the workpiece M under bending. As can be noticed from a comparison between FIGS. 4 and 5, which refer to the condition where the workpiece is not bent and to the condition where the workpiece is bent, respectively, the two pairs of guide rollers 66, 68 and 74, 76 ensure the correct positioning, as defined above, of the first carriage 12 with respect to the workpiece M, while the two measure rollers 34 and 36 move along the direction y depending on the bending radius of the workpiece.

The measure of the forwarding, in particular of the forwarding after bending, and the measure of the bending radius with the above-described measuring unit are obtained in the following manner.

As the radius of the measure rollers 34 and 36 is known, measuring by means of the encoders 50 and 52 the angle of rotation of these rollers allow to obtain the measures of the forwarding of the workpiece both on the intrados surface $S_i$ (measure roller 34 and encoder 50) and on the extrados surface $S_e$ (measure roller 36 and encoder 52). The arithmetic mean of these measures gives the value of the forwarding of the workpiece M at the longitudinal axis x of the same.

Figure 7:
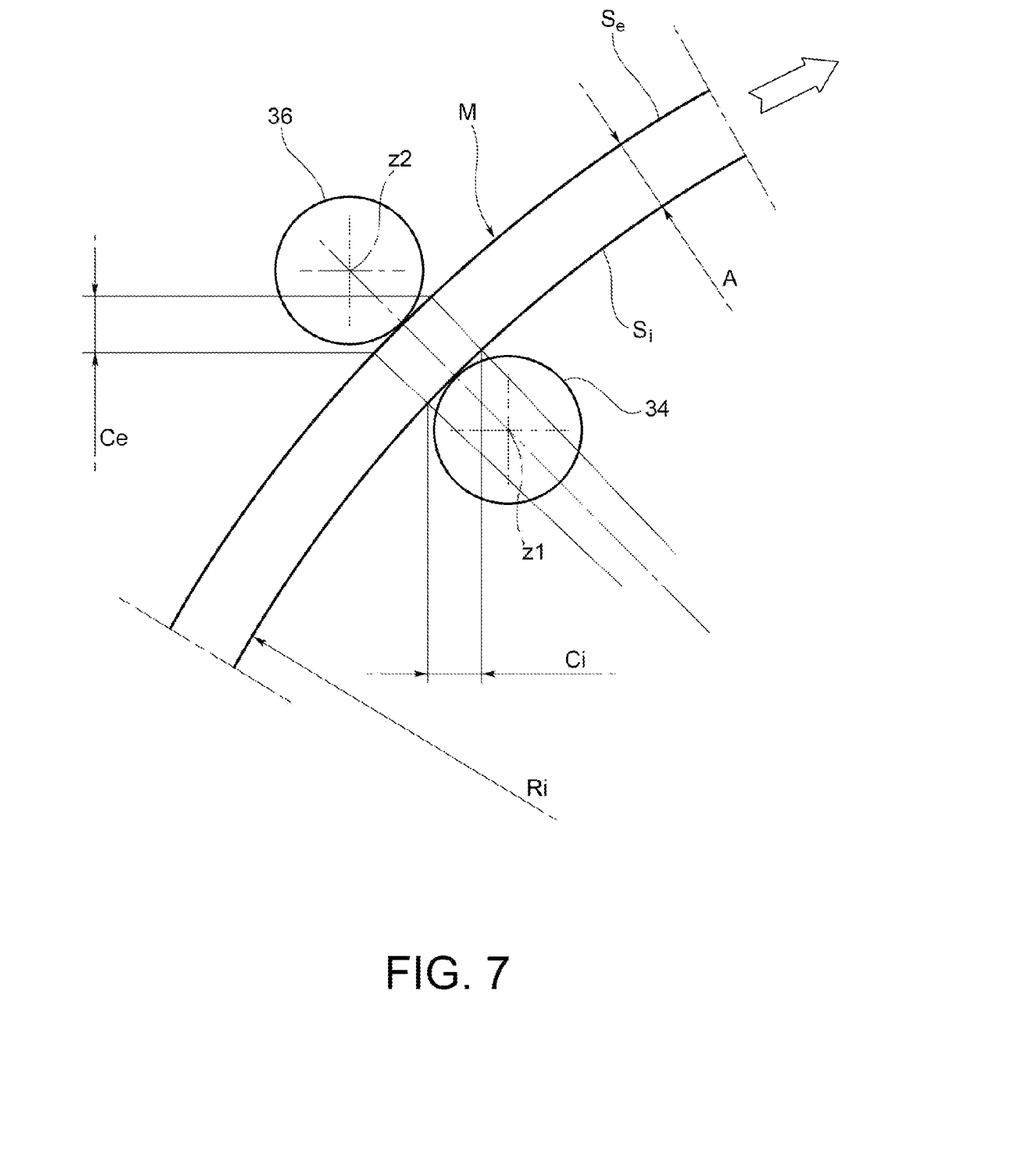
FIG. 7 schematically show the quantities used for the calculation of the bending radius with the measuring unit of FIG. 1.

As far as the measure of the bending radius is concerned, the scheme of FIG. 7 shows that measuring, by means of the first measure roller 34 and the associated encoder 50, the forwarding (indicated $C_i$) of the workpiece M on the intrados surface $S_i$ and, by means of the second measure roller 36 and the associated encoder 52, the forwarding (indicated $C_e$) of the workpiece M on the extrados surface $S_e$, and measuring, by means of the inductive displacement transducer 60, the distance between the axes of the measure rollers 34 and 36, and hence the transverse size (indicated A) of the workpiece M allow to obtain the bending radius $R_i$ based on the following equation:

$$R_i = A/(C_e/C_i - 1).$$

The first carriage 12 is also provided with a marking device 82 (FIGS. 2 and 3) arranged to produce an optically detectable mark on a surface (in the illustrated example the extrados surface $S_e$) of the workpiece M under bending. The marking device 82, which is only partially and schematically shown in the drawings, is of per-se-known type and will not therefore be described in detail.

The mark produced by the marking device 82 on the workpiece M is detected by an optical detection device 84 which is mounted on board of the second carriage 14. As already stated above, the second carriage 14 is connected to the first carriage 12 by means of retaining means (steel ribbon 18) arranged to keep this carriage at a given fixed distance, measured along a direction parallel to the longitudinal axis x of the workpiece M.

Figure 8:
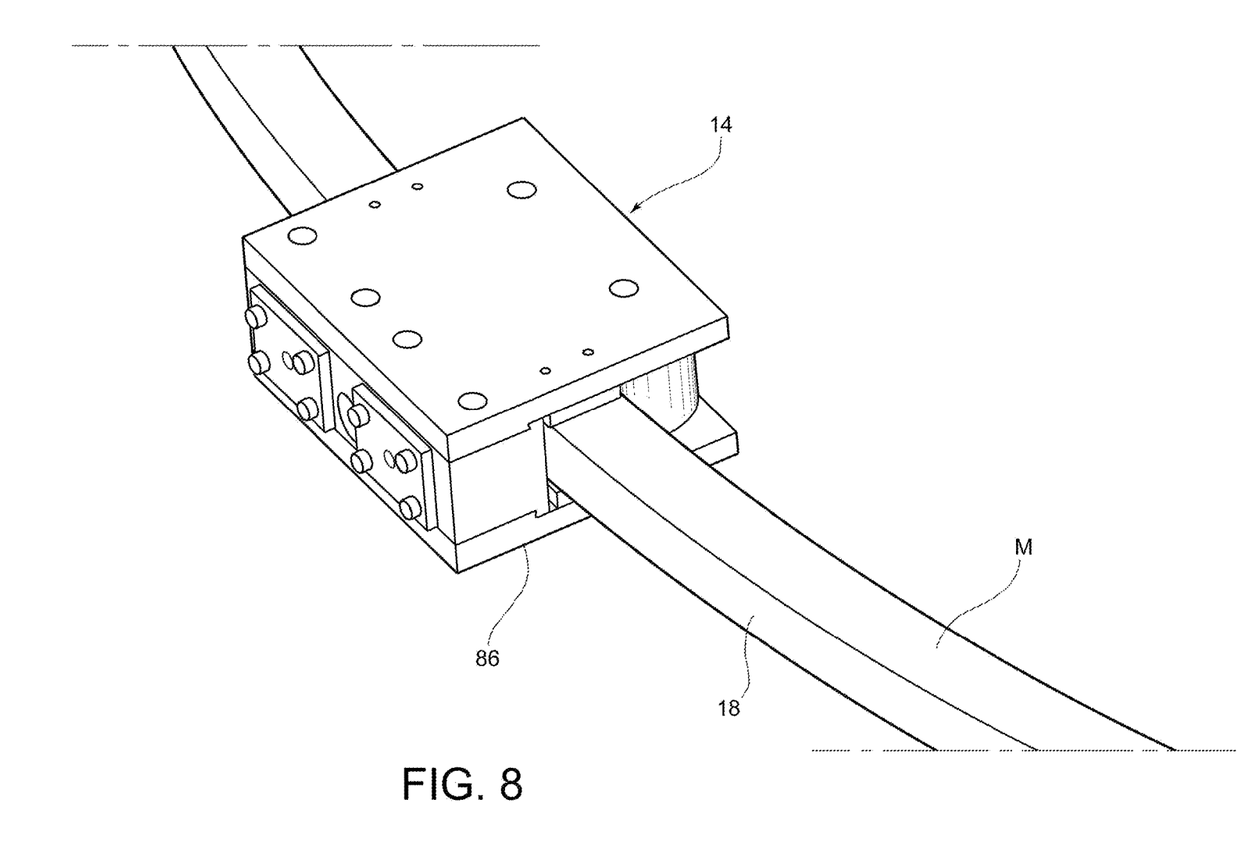
FIG. 8 is a perspective view of the second carriage of the measuring unit of FIG. 1.
Figure 9:
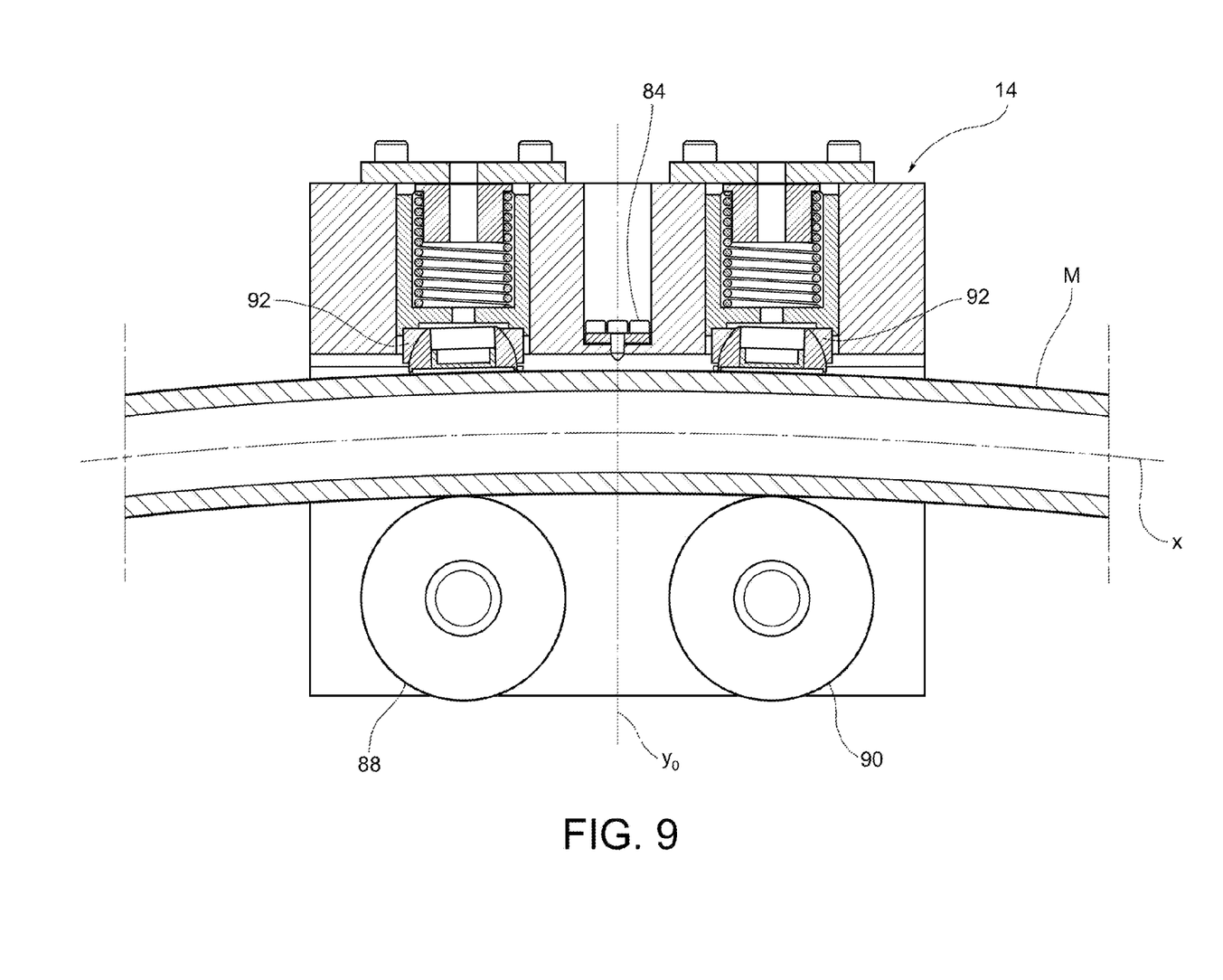
FIG. 9 is a plan view, partially sectioned, of the second carriage of the measuring unit of FIG. 1, in a condition where the workpiece is bent.

With reference to FIGS. 8 and 9, the second carriage 14 comprises a main body 86 which carries, in addition to the above-mentioned optical detection device 84, positioning means arranged to define the positioning of the main body 86, and hence of the optical detection device 84, relative to the workpiece M under bending, in such a manner that the optical axis (indicated $y_o$) of the optical detection device 84 is substantially perpendicular, during bending with a constant bending radius, to the tangent t to the longitudinal axis x of the workpiece in the point of intersection between these axes. Like in the first carriage 12, also in the second carriage 14 the positioning means comprise a pair of guide rollers 88 and 90. The guide rollers 88 and 90 are supported by the main body 86 so as to be idly rotatable about respective stationary axes of rotation, which are oriented perpendicular to the bending plane. Moreover, the guide rollers 88 and 90 abut against the intrados surface $S_i$ (or, alternatively, against the extrados surface $S_e$) of the workpiece M under bending. The positioning means further comprise at least one spring-loaded counteracting member 92 which abuts against the opposite surface of the workpiece. In the embodiment shown in FIG. 9 two counteracting members 92 are provided for and are made as shoes, but it may also be envisaged that only one counteracting member is provided for and/or that the at least one counteracting member is made as a roller.

Since an optical detection device is provided for, which is placed at a given fixed distance, measured parallel to the longitudinal axis of the workpiece, from a marking device and is able to detect a mark produced by the latter device on the workpiece under bending, the measuring unit is able to detect with high precision intervals of forwarding after bending equal to the aforesaid distance and therefore it is possible to increase the precision in the measurement of the forwarding after bending, particularly in case of very long workpieces.

As already stated above, this further aspect of the invention, that is to say, the provision of marking means and of optical detection means which are kept at a given fixed distance from each other by suitable retaining means, might also be applied to a measuring unit arranged to measure the forwarding after bending which is of a different type from the one described above with reference to FIGS. 2 to 7, for example to a measuring unit having only one measure roller which is kept in contact with the intrados surface or with the extrados surface of the workpiece and measuring means arranged to measure the angular position of said measure roller about its axis of rotation.

Naturally, the principle of the invention remaining unchanged, the embodiments and the constructional details may be greatly modified with respect to those described and illustrated purely by way of a non-limiting example, without thereby departing from the scope of protection as defined in the appended claims.

What is claimed is:

1. A measuring unit for measuring a bending radius and a forwarding of a workpiece while the workpiece is being bent in a given bending plane by a bending machine,
wherein the measuring unit comprises a first carriage which is arranged to be connected to the bending machine and to be passed through by the workpiece, wherein the first carriage comprises
a main body;
a pair of support bodies carried by the main body;
a pair of measure rollers mounted each on a respective support body so as to be idly rotatable each about a respective axis of rotation, the axes of rotation of the measure rollers being parallel to each other and perpendicular to the bending plane;
a first measuring device arranged to provide a signal indicative of an angular position of each of the measure rollers about the respective axis of rotation;
a guide device mounted on the main body so as to guide the support bodies along a straight direction perpendicular to, and passing through, the axes of rotation of the measure rollers;
an elastic device arranged to apply on the support bodies an elastic force tending to urge the support bodies towards each other, and therefore to urge each measure roller against the workpiece when the workpiece is moved forward between the measure rollers, so as to cause each measure roller to roll on a respective intrados surface or extrados surface of the workpiece while the workpiece is moved forward through the first carriage;
a second measuring device arranged to provide a signal indicative of a distance between the axes of rotation of the measure rollers; and
a positioning device arranged to define a positioning of the main body, and hence of the guide device, relative to the workpiece, in such a manner that during bending with a constant bending radius a tangent to the longitudinal axis of the workpiece in a point of intersection between the longitudinal axis of the workpiece and the straight direction of the guide device is perpendicular to said straight direction;
wherein said elastic device comprises at least one spring which is connected at one end thereof to one of the two support bodies and at an opposite end thereof to the other one of the two support bodies, whereby a resulting normal force applied by said elastic device on the workpiece is zero, and
wherein said positioning device comprises a first pair of guide rollers and a second pair of guide rollers which are arranged upstream and downstream of the measure rollers, respectively, and are supported by the main body so as to be idly rotatable about respective axes of rotation parallel to the axes of rotation of the measure rollers.

2. A measuring unit according to claim 1, wherein said elastic device comprises a pair of cylindrical helical springs extending parallel to said straight direction.

3. A measuring unit according to claim 1, wherein said first measuring device comprises a pair of encoders associated each to a respective measure roller.

4. A measuring unit according to claim 1, wherein said second measuring device comprises an inductive displacement transducer configured to measure the distance between a pair of reference elements which are fixed each to a respective support body.

5. A measuring unit according to claim 1, wherein each of said first pair of guide rollers and second pair of guide rollers comprises a first guide roller having an axis of rotation which is fixed relative to the main body and a second guide roller which is elastically urged towards the first guide roller by means of a spring-loaded urging member.

6. A measuring unit according to claim 1, further comprising a second carriage arranged to be passed through by the workpiece under bending downstream of the first carriage and a retaining device which connects the first carriage and the second carriage to each other, keeping the second carriage at a given fixed distance, measured along the workpiece under bending, wherein the first carriage further comprises a marking device arranged to produce an optically detectable mark on the workpiece under bending and wherein the second carriage comprises an optical detection device arranged to detect the mark produced by said marking device on the workpiece under bending.

7. A measuring unit according to claim 6, wherein said retaining device is formed by a steel ribbon of predetermined length, which is secured at one end thereof to the first carriage and at an opposite end thereof to the second carriage so as to remain in contact with the extrados surface of the workpiece under bending.

8. A measuring unit for measuring a forwarding after bending of a workpiece while the workpiece is being bent in a given bending plane by a bending machine,
the measuring unit comprising
a first carriage arranged to be connected to the bending machine;
a second carriage connected to the first carriage downstream of the same, in such a manner that during bending the workpiece coming from the bending machine passes first through the first carriage and then through the second carriage; and
a retaining device which connects the first carriage and the second carriage to each other keeping them at a given fixed distance, measured along the workpiece under bending,
wherein the first carriage comprises at least one measure roller which is rotatably mounted about an axis of rotation perpendicular to the bending plane and is arranged to be kept in rolling contact with an intrados surface or an extrados surface of the workpiece under bending, a measuring device arranged to provide a signal indicative of an angular position of said at least one measure roller about an axis of rotation thereof, and a marking device arranged to produce an optically detectable mark on the workpiece under bending, and
wherein the second carriage comprises an optical detection device arranged to detect the mark produced by said marking device on the workpiece under bending.

9. A measuring unit according to claim 8, wherein said retaining device is formed by a steel ribbon of predetermined length, which is secured at one end thereof to the first carriage and at an opposite end thereof to the second carriage so as to remain in contact with the extrados surface of the workpiece under bending.

\* \* \* \* \*